United States Patent

[11] 3,628,332

[72] Inventor John J. Kelmar
 2205 Cypress Drive, White Oak Borough, Pa. 15131
[21] Appl. No. 29,061
[22] Filed Apr. 16, 1970
[45] Patented Dec. 21, 1971

[54] NONPOLLUTING CONSTANT OUTPUT ELECTRIC POWER PLANT
 13 Claims, 1 Drawing Fig.
[52] U.S. Cl. .................................................. 60/105, 55/80, 60/108
[51] Int. Cl. ........................................................ F22b 35/00, F01b 27/00
[50] Field of Search ............................................. 55/80; 60/2, 105–108

[56] References Cited
UNITED STATES PATENTS
1,564,553 12/1925 Gibson .......................... 60/105
1,583,398 5/1926 Gibson .......................... 60/105
1,600,583 9/1926 Gleichmann ................. 60/106
3,121,409 2/1964 Bogot ............................. 110/106

Primary Examiner—Martin P. Schwadron
Assistant Examiner—Allen M. Ostrager
Attorney—Brown, Murray, Flick & Peckham ABSTRACT: Oxygen is delivered to a gas producer to gasify coal to produce fuel which is then delivered with more oxygen to a boiler furnace to generate steam and to form products of combustion that include water vapor and carbon dioxide. The water vapor is condensed and separated from the carbon dioxide. The steam is conducted to a steam turbine at a rate that enables it to operate the plant at substantially full capacity continuously. The turbine drives an electric generator. During periods of reduced load, surplus power from the plant is used for liquefying some of the separated carbon dioxide. Some of the surplus power also is used for operating air separation apparatus, to which the liquefied carbon dioxide is conducted to aid in producing liquid oxygen in excess of the oxygen requirements of the gas producer and furnace during the reduced load period. The surplus liquid oxygen is stored for use, after warming, in the plant between the periods of reduced load when the air separation apparatus is not operating.

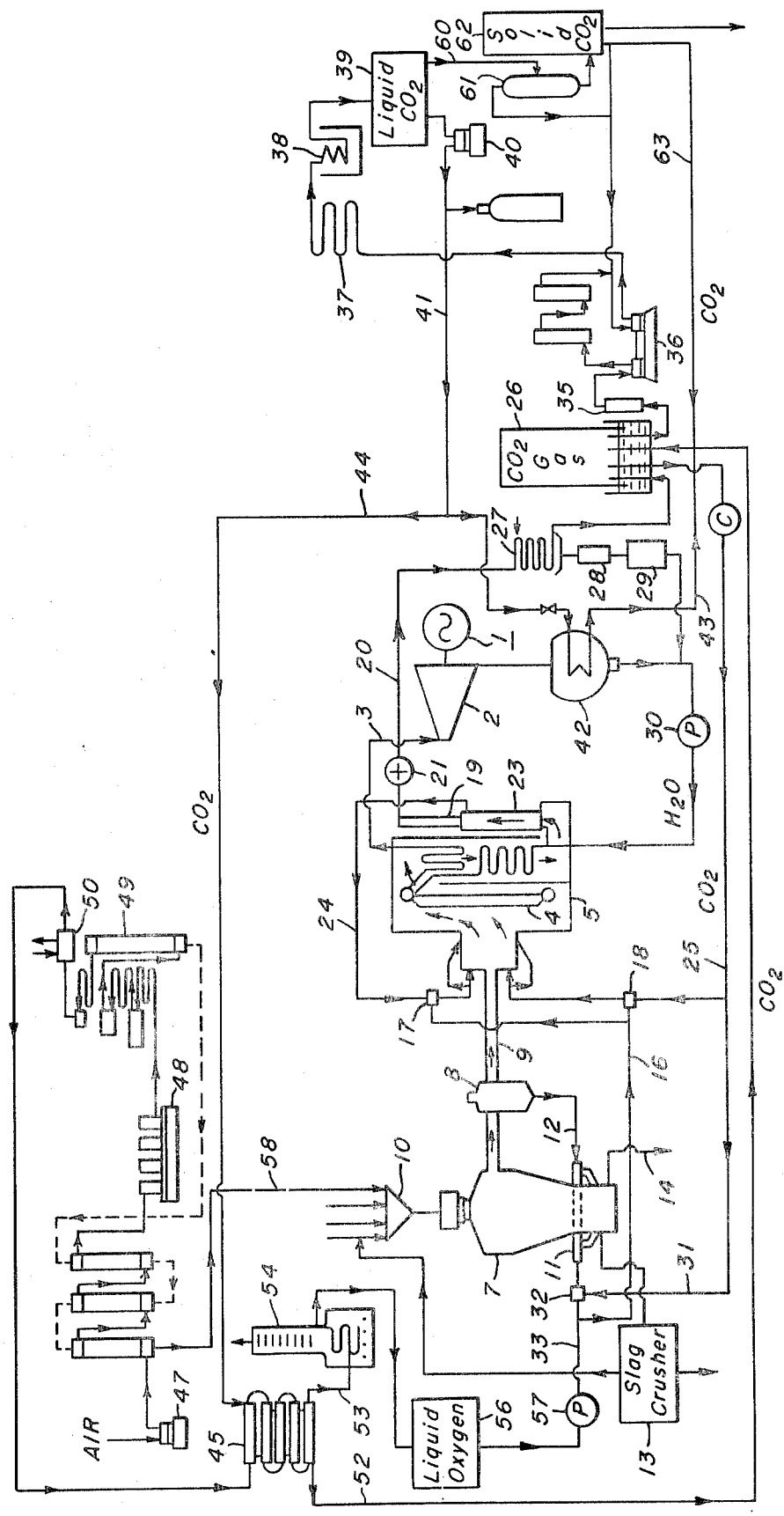

NONPOLLUTING CONSTANT OUTPUT ELECTRIC POWER PLANT

Large electric power plants are not operated at a constant output rate, but are operated at full capacity only while the loads are high, and at low capacity when the loads are reduced. This is known to be an inefficient way to operate a power plant, but it is standard procedure. The national plant factor operation is approximately 60 percent of its rated capacity. Furthermore, expansion of steam-electric power generating capacity using as fuel coal, fuel oil or natural gas is being delayed at a growing number of locations because of their pollution of the environment. It has been estimated that the electric power generating industry produces about 15 percent of all atmospheric pollutants. In the current practice of direct burning of coal for steam power, using air for combustion, the oxygen is burned out of the air and the following atmospheric pollutants are produced: carbon dioxide, carbon monoxide, sulfur oxides, nitrogen oxide, free nitrogen, free hydrogen, soot, unburned carbon, fly ash and water vapors. It is possible to use some of the atmospheric pollutants as fuel for power generating purposes, but the additional cost required for equipment to handle and burn such fuel may exceed its value. On the other hand, the cost of otherwise disposing of the waste products can be considerable.

In addition, the electric power industry contributes about 80 percent of thermal pollutants from the cooling water they use. After being heated, the cooling water is dumped and where it enters streams, ponds, lakes or oceans, it changes the temperature of the water and thereby affects the aquatic life. Of course, special provision can be made for recooling the heated cooling water, but that involves additional expense and in some cases creates fogging conditions in cold weather.

It is an object of this invention to provide for the operation of an electric power plant in a manner that will be more economical than heretofore and that will not pollute the environment. This is accomplished by operating the power plant in a closed cycle at its fully rated capacity continuously and using the energy produced during offpeak hours to manufacture oxygen and carbon dioxide for use in the plant instead of air and for possible sale of any excess.

The invention is illustrated in the accompanying drawing, which is a diagram of my electric power plant system.

Referring to the drawing, a electric generator 1 is driven by a steam turbine 2 which receives its steam through a pipe 3 from the boiler 4 in a boiler furnace 5. The fuel used in the combustion chamber of this furnace is not coal burned in the presence of air, but gas produced by gasifying coal and then burned with oxygen. To gasify the coal there is a gas producer 7, the outlet of which is connected to a dust collector 8, from which the cleaned gas is delivered through a pipe 9 to the furnace. Coal, limestone and crushed slag are fed into the top of the gas producer from a mixer 10. The principal reagent for combustion of the coal in the producer is the oxygen just mentioned, which is injected into tuyeres 11 around the producer. The dust disposed in the dust collector is fed back to the gas producer through a pipe 12. Slag formed in the bottom of the producer removes and holds the sulfur from the coal and is withdrawn and delivered to a slag crusher 13, from which some is returned to mixer 10. The rest of the crushed slag can be removed for any suitable use, such as road material. Molten iron collects below the slag from reduction of iron oxides ($Fe_2O_3$) in the coal ash. It can be removed periodically through a conduit 14.

Oxygen from the same source as that for the gas producer is also delivered through a pipe 16 to control stations 17 and 18, from which it is fed into the furnace to aid in the combustion of the fuel gas. As the fuel burns, it produces heat that generates steam in the boiler. It also forms products of combustion made up of water vapor and carbon dioxide, which are withdrawn from the sealed stack 19 of the furnace through a pipe 20, in which there is a suction fan 21. The furnace is also provided with a waste heat boiler 23 that produces superheated steam that is fed back through a line 24 to control station 17, where the steam and oxygen are mixed in proportions of about 60 percent oxygen and 40 percent steam to control the temperature of the flame in the furnace. At control station 18, about the same percent of oxygen is mixed with $CO_2$ that comes through a line 25 from a holding tank 26, to which $CO_2$ from the furnace stack is delivered continuously by the suction fan 21 via a condenser 27 in which the accompanying water vapor is condensed. The $CO_2$ dilutes the oxygen to control flame temperature. The condensed vapor passes through a deactivator 28 and enters a storage tank 29, from which it can be delivered by a feed pump 30 to the boiler. The $CO_2$ line 25 also is connected by a pipe 31 to a control station 32 in a pipe 33 that delivers the oxygen to the gas producer and to the pipe 16 leading to the furnace. The $CO_2$ dilutes the oxygen to control the temperature in the gas producer.

The $CO_2$ holding tank also delivers $CO_2$ gas through a cooler 35 to a multistage compressor 36 connected to another cooler 37 and a condenser 38 where liquid $CO_2$ is formed that is delivered to the storage tank 39. Some of the liquid $CO_2$ from the tank is compressed to a still higher pressure by a compressor 40 and part of it is delivered through a pipe 41 to a steam condenser 42 connected with the outlet of the turbine. The steam condensed by the liquid $CO_2$ is connected with the boiler feed pump 30, and the $CO_2$ that returns to its gaseous form in cooling the steam is returned through a pipe 43 to the holding tank 26.

The rest of the liquid $CO_2$ from compressor 40 is conducted through a pipe 44 to a carbon dioxide refrigerator 45 that forms part of a conventional air separation plant, in which air is separated into oxygen and nitrogen. Thus, the air is pumped through a compressor 47 and then $CO_2$ and any dust present in the air are removed by scrubbing with a KOH solution. The air then passes through a multiple stage compressor 48, with water cooling between the stages. Any moisture that condenses out during this process is removed by flow through a tower 49 packed with solid KOH. After the gas leaves the last compression stage it is water-cooled to about 86° F. in cooler 50 and further cooled to $-22°$ F. by the liquid $CO_2$ in refrigerator 45.

The $CO_2$ in the refrigerator is returned through a line 52 to holding tank 26. The refrigerated air, on the other hand, flows through a pipe 53 to a rectifier 54 where the air is liquefied and separated into its constituents, with the nitrogen escaping from the rectifier to the atmosphere. The liquid oxygen from the rectifier is delivered to an insulated storage tank 56 connected by a pump 57 to pipe 33 and control station 32 where the oxygen is warmed to atmospheric temperature and mixed as a gas with $CO_2$ from pipe 31. Spent KOH from the air separation plant is delivered through a pipe 58 to mixer 10 above the gas producer.

Any liquid carbon dioxide from tank 39 not needed in the operation of the plant can be delivered through a line 60 to an expansion tank 61 and a solid $CO_2$ machine 62 that will produce solid $CO_2$ for sale or other disposition.

The gas producer can use all sizes of coal as mined. The gas produced is free of sulfur and is of low density. By burning gas in the boiler furnace, ash handling equipment, soot blowers, dust collectors and stack discharge effluent are eliminated. The use of oxygen instead of air in the furnace has the advantage that there is no nitrogen to be heated, circulated and finally passed out with waste gas, which would require a considerable expenditure of heat and power and would result in large quantities of heat being carried away by the hot nitrogen. The plant can be operated at its highest efficiency 24 hours a day because during periods of low loads the surplus energy produced is used for making and storing liquid oxygen and liquid $C)_2$ which are used continuously in the operation of the plant.

The waste $CO_2$ and water vapor that are mixed with the fuel for the furnace absorb sensile heat and produce dissociation combustion reactions. In the process of dissociation of $CO_2$ and $H_2O$ into atom constituents of carbon, hydrogen and oxygen, energy is absorbed and the high temperature is reduced. When the temperature falls below dissociation temperature, the fuel elements of carbon and hydrogen again combine with oxygen to release energy and form products of completed reaction of $CO_2$ and $H_2O$.

Because of the use of oxygen and gasified coal and the arrangement of the power plant elements disclosed herein, it will be seen that the plant can be, and is, operated on a closed cycle. This eliminates the discharge of air pollutants and high temperature water, in view of which this plant does not pollute the environment. This feature alone is a great advantage, even without the more efficient operation of the plant which is an integral part of the antipollution feature.

According to the provisions of the patent statutes, I have explained the principle of my invention and have illustrated and described what I now consider to represent its best embodiment. However, I desire to have it understood that, within the scope of the appended claims. The invention may be practiced otherwise than as specifically illustrated and described.

I claim:

1. A substantially constant output electric power plant that does not pollute the environment, the plant comprising a gas producer, means for delivering oxygen to the producer to gasify coal therein at a substantially constant rate to produce fuel, a boiler furnace, means for delivering oxygen and said fuel to the furnace for burning therein to produce steam to form products of combustion that include water vapor and $CO_2$, means for condensing water vapor and separating it from the $CO_2$, a steam turbine, means for conducting said steam to the turbine at a rate to enable it to operate the plant at substantially full capacity continuously, an electric generator driven by the turbine, means operated by surplus power from the plant only during periods of reduced load for liquefying some of the separated $Co_2$, air separation apparatus operated by some of said surplus power during only said periods, means for conducting liquefied $CO_2$ to said apparatus while it is operating to aid in producing liquid oxygen in excess of the oxygen requirements of the gas producer and furnace during said reduced load periods, means for storing the surplus liquid oxygen for use in the plant between periods of reduced load when said air separation apparatus is not operating, and means for warming the liquid oxygen to gasify it before it is used.

2. A electric power plant according to claim 1, in which enough of said $Co_2$ is liquefied to produce a surplus, said plant including apparatus for producing solid $Co_2$ from the surplus $CO_2$.

3. An electric power plant according to claim 1, including means for delivering some of the $CO_2$ gas to said gas producer.

4. A electric power plant according to claim 1, including means for delivering some of said steam to said fuel.

5. A electric power plant according to claim 1, including a condenser for steam leaving the turbine, means for conducting some of the liquid $CO_2$ to said condenser to cool the steam therein, sand means for conducting the condensate from the condenser to said boiler furnace to be converted to steam again.

6. An electric power plant according to claim 1, including means for delivering crushed slag and limestone to said gas producer, a slag crusher, means for delivering slag from the gas producer to said crusher, and means for returning some of the crushed slag from said crusher to said crushed slag delivering means.

7. An electric power plant according to claim 1, including an $CO_2$ holding tank connected between said condensing means and $CO_2$ liquefying means, means for conducting $CO_2$ from said air separation apparatus to said tank, and means for conducting $CO_2$ from said tank to the gas producer.

8. The method of economically operating an electric power plant in which an electric generator is driven by a steam turbine, said method comprising utilizing oxygen continuously to gasify coal at a substantially constant rate to produce a gaseous fuel, burning said fuel with oxygen to form products of combustion that include water vapor and $CO_2$ gas and to produce heat, condensing said water vapor and separating it from the $CO_2$, heating water with said heat to produce steam for the turbine at a rate to enable it to operate the plant at a substantially full capacity continuously, using the surplus power from the plant only during periods of reduced load to liquefy some of the separated $CO_2$ and to operate air separation apparatus with the help of the liquefied $CO_2$ in order to produce liquid oxygen in excess of the oxygen requirements of the plant during said reduced load periods, storing the surplus liquid oxygen for use in the plant between periods of reduced load when said air separation apparatus is not operating, and warming the liquid oxygen to gasify it before it is used, whereby the plant does not pollute the environment.

9. The method recited in claim 8, including liquefying enough of said $CO_2$ to produce a surplus, and producing solid $CO_2$ from the surplus $CO_2$.

10. The method recited in claim 8, including continuously mixing some of said $CO_2$ gas with the oxygen used in gasifying the coal.

11. The method recited in claim 8, including mixing some of said steam with said fuel.

12. The method recited in claim 8, including using some of said liquid $CO_2$ for condensing steam leaving the turbine to furnish said water being heated to produce steam.

13. The method recited in claim 8, including adding crushed slag and limestone to the coal being gasified to thereby produce slag, and drawing off the produced slag and crushing it and returning some of it to the coal being gasified.

* * * * *